US009092437B2

(12) United States Patent
Joy et al.

(10) Patent No.: US 9,092,437 B2
(45) Date of Patent: Jul. 28, 2015

(54) EXPERIENCE STREAMS FOR RICH INTERACTIVE NARRATIVES (75) Inventors: Joseph M. Joy, Redmond, WA (US); Narendranath Datha, Bangalore (IN); Eric J. Stollnitz, Kirkland, WA (US); Aditya Sankar, Seattle, WA (US); Vinay Krishnaswamy, Woodinville, WA (US); Sujith Radhakrishnan Warrier, Bangalore (IN); Kanchen Rajanna, Seattle, WA (US); Tanuja Abhay Joshi, Panchavati (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 757 days.

(21) Appl. No.: 13/008,616

(22) Filed: Jan. 18, 2011

(65) Prior Publication Data
US 2011/0113334 A1   May 12, 2011

Related U.S. Application Data (63) Continuation-in-part of application No. 12/347,868, filed on Dec. 31, 2008, now Pat. No. 8,046,691.

(51) Int. Cl.
*G06F 3/01*   (2006.01)
*G06F 17/30*   (2006.01)
*G06F 3/00*   (2006.01)

(52) U.S. Cl.
CPC ................. *G06F 17/30056* (2013.01)

(58) Field of Classification Search
CPC ..... G06F 8/34; G06F 9/4443; H04N 5/44543; G11B 27/34
USPC ......... 715/723, 751, 202, 209, 753, 757, 763, 715/235, 719, 530; 345/419, 475, 719
See application file for complete search history.

(56) References Cited

U.S. PATENT DOCUMENTS 4,305,131 A   12/1981 Best
5,737,527 A   4/1998 Shiels et al.
(Continued)

OTHER PUBLICATIONS

Mazalek, et al., "Tangible Viewpoints: A Physical Approach to Multimedia Stories", Retrieved at << http://citeseerx.ist.psu.edu/viewdoc/download?doi=10.1.1.6.4303&rep=rep1&type=pdf >>, Proceedings of the tenth ACM international conference on Multimedia, 2002, pp. 8.
(Continued)

*Primary Examiner* — Amy Ng
*Assistant Examiner* — Toan Vu
(74) *Attorney, Agent, or Firm* — Micah Goldsmith; Judy Yee; Micky Minhas (57) ABSTRACT "Experience Streams" (ESs) are used by a "rich interactive narrative" (RIN) data model as basic building blocks that are combined in a variety of ways to enable or construct a large number of RIN scenarios for presenting interactive narratives to the user. In general various ES types contain all the information required to define and populate a particular RIN, as well as the information (in the form of a series of navigable states) that charts an animated and interactive course through each RIN. In other words, combinations of various ES provide a scripted path through a RIN environment, as well as various UI controls and/or toolbars that enable user interaction with the interactive narrative provided by each RIN. Example ESs include, but are not limited, content browser experience streams, zoomable media experience streams, relationship graph experience streams, player-controls/toolbar experience streams, etc.

20 Claims, 4 Drawing Sheets

Simplified Exemplary Experience Stream Architecture

(56) References Cited

U.S. PATENT DOCUMENTS

| | | | |
|---|---|---|---|
| 5,751,953 | A | 5/1998 | Shiels et al. |
| 5,999,172 | A | 12/1999 | Roach |
| 6,097,393 | A | 8/2000 | Prouty, IV et al. |
| 6,144,375 | A | 11/2000 | Jain et al. |
| 6,154,771 | A | 11/2000 | Rangan et al. |
| 6,369,835 | B1 | 4/2002 | Lin |
| 6,463,205 | B1 | 10/2002 | Aschbrenner et al. |
| 6,480,191 | B1 | 11/2002 | Balabanovic |
| 6,507,353 | B1 | 1/2003 | Huard et al. |
| 6,510,432 | B1 | 1/2003 | Doyle |
| 6,544,040 | B1 | 4/2003 | Brelis et al. |
| 6,665,658 | B1 | 12/2003 | DaCosta et al. |
| 6,892,325 | B2 | 5/2005 | Bates et al. |
| 7,062,712 | B2 | 6/2006 | Schneider et al. |
| 7,155,158 | B1 | 12/2006 | Iuppa et al. |
| 7,226,771 | B2 | 6/2007 | Gramatikova et al. |
| 7,246,315 | B1* | 7/2007 | Andrieu et al. ............... 715/706 |
| RE39,830 | E | 9/2007 | Balabanovic |
| 7,309,283 | B2 | 12/2007 | Nemitz |
| 7,376,932 | B2 | 5/2008 | Chen et al. |
| 7,496,211 | B2 | 2/2009 | Yamagami et al. |
| 7,669,128 | B2 | 2/2010 | Bailey et al. |
| 7,761,865 | B2 | 7/2010 | Stienhans et al. |
| 7,818,658 | B2 | 10/2010 | Chen |
| 7,904,812 | B2 | 3/2011 | Atlas et al. |
| 8,046,691 | B2 | 10/2011 | Sankar et al. |
| 2002/0019845 | A1 | 2/2002 | Hariton |
| 2002/0069217 | A1 | 6/2002 | Chen et al. |
| 2002/0124048 | A1 | 9/2002 | Zhou |
| 2002/0143803 | A1 | 10/2002 | Chen et al. |
| 2002/0154174 | A1 | 10/2002 | Redlich et al. |
| 2002/0176636 | A1 | 11/2002 | Shefi |
| 2003/0164847 | A1 | 9/2003 | Zaima et al. |
| 2003/0192049 | A1 | 10/2003 | Schneider et al. |
| 2004/0001106 | A1 | 1/2004 | Deutscher et al. |
| 2004/0021684 | A1 | 2/2004 | B. Millner |
| 2004/0034869 | A1 | 2/2004 | Wallace et al. |
| 2004/0040744 | A1 | 3/2004 | Wyrzykowska et al. |
| 2004/0070595 | A1 | 4/2004 | Atlas et al. |
| 2004/0125133 | A1 | 7/2004 | Pea et al. |
| 2004/0199923 | A1 | 10/2004 | Russek |
| 2004/0205515 | A1 | 10/2004 | Socolow et al. |
| 2004/0267816 | A1 | 12/2004 | Russek |
| 2005/0028194 | A1 | 2/2005 | Elenbaas et al. |
| 2006/0106764 | A1* | 5/2006 | Girgensohn et al. ............. 707/3 |
| 2006/0155703 | A1 | 7/2006 | Dejean et al. |
| 2006/0236342 | A1 | 10/2006 | Kunkel et al. |
| 2006/0277454 | A1 | 12/2006 | Chen |
| 2006/0277470 | A1 | 12/2006 | Schneider et al. |
| 2007/0003223 | A1 | 1/2007 | Armstrong et al. |
| 2007/0005795 | A1 | 1/2007 | Gonzalez |
| 2007/0006078 | A1 | 1/2007 | Jewsbury et al. |
| 2007/0011607 | A1 | 1/2007 | Lazareck et al. |
| 2007/0033632 | A1* | 2/2007 | Baynger et al. ............... 725/135 |
| 2007/0038931 | A1 | 2/2007 | Allaire et al. |
| 2007/0038938 | A1 | 2/2007 | Canora et al. |
| 2007/0073475 | A1 | 3/2007 | Endo |
| 2007/0100891 | A1 | 5/2007 | Nee |
| 2007/0113182 | A1 | 5/2007 | Hollemans |
| 2007/0118801 | A1 | 5/2007 | Harshbarger et al. |
| 2007/0132767 | A1 | 6/2007 | Wright et al. |
| 2007/0162854 | A1 | 7/2007 | Kikinis |
| 2007/0169165 | A1 | 7/2007 | Crull et al. |
| 2007/0214408 | A1 | 9/2007 | Straub et al. |
| 2007/0240060 | A1 | 10/2007 | Berenbach et al. |
| 2008/0054566 | A1 | 3/2008 | Schmidt |
| 2008/0147313 | A1* | 6/2008 | Nesbitt ............... 701/201 |
| 2008/0195664 | A1 | 8/2008 | Maharajh et al. |
| 2008/0212932 | A1 | 9/2008 | Lee et al. |
| 2008/0215985 | A1 | 9/2008 | Batchelder et al. |
| 2008/0270889 | A1 | 10/2008 | Slosar |
| 2008/0270905 | A1 | 10/2008 | Goldman |
| 2008/0275881 | A1 | 11/2008 | Conn et al. |
| 2008/0278481 | A1 | 11/2008 | Aguera y Arcas et al. |
| 2009/0031246 | A1 | 1/2009 | Cowtan et al. |
| 2009/0064003 | A1 | 3/2009 | Harris et al. |
| 2009/0094522 | A1 | 4/2009 | Tu et al. |
| 2009/0100452 | A1 | 4/2009 | Hudgeons et al. |
| 2009/0106671 | A1 | 4/2009 | Olson et al. |
| 2009/0150760 | A1 | 6/2009 | Winkler et al. |
| 2009/0150797 | A1 | 6/2009 | Burkholder et al. |
| 2009/0171987 | A1 | 7/2009 | Coppinger et al. |
| 2009/0187481 | A1 | 7/2009 | Bonzi et al. |
| 2009/0217242 | A1 | 8/2009 | Banks |
| 2009/0228572 | A1 | 9/2009 | Wall et al. |
| 2009/0228784 | A1 | 9/2009 | Drieu et al. |
| 2009/0254802 | A1 | 10/2009 | Campagna et al. |
| 2009/0260060 | A1 | 10/2009 | Smith et al. |
| 2010/0004944 | A1 | 1/2010 | Palaniappan |
| 2010/0023553 | A1 | 1/2010 | Gausman et al. |
| 2010/0050082 | A1 | 2/2010 | Katz et al. |
| 2010/0111417 | A1 | 5/2010 | Ward et al. |
| 2010/0123908 | A1 | 5/2010 | Denoue et al. |
| 2010/0153448 | A1 | 6/2010 | Harpur et al. |
| 2010/0157018 | A1 | 6/2010 | Lampotang et al. |
| 2010/0169776 | A1 | 7/2010 | Sankar et al. |
| 2010/0313144 | A1 | 12/2010 | Conn et al. |
| 2010/0325558 | A1 | 12/2010 | Edwards et al. |
| 2011/0053491 | A1 | 3/2011 | Bolton et al. |
| 2011/0113315 | A1 | 5/2011 | Datha et al. |
| 2011/0113316 | A1 | 5/2011 | Datha et al. |
| 2011/0119587 | A1 | 5/2011 | Joy et al. |
| 2011/0145428 | A1 | 6/2011 | Wei et al. |
| 2011/0161802 | A1 | 6/2011 | Jia et al. |
| 2011/0191163 | A1 | 8/2011 | Allaire et al. |
| 2011/0307527 | A1 | 12/2011 | Roenning |
| 2012/0042250 | A1 | 2/2012 | Hartwig et al. |
| 2012/0066573 | A1 | 3/2012 | Berger et al. |
| 2012/0117473 | A1 | 5/2012 | Han et al. |
| 2012/0131041 | A1 | 5/2012 | Ashland et al. |
| 2012/0150907 | A1 | 6/2012 | Chowdhury et al. |
| 2012/0173981 | A1 | 7/2012 | Day |
| 2012/0301114 | A1* | 11/2012 | Johnson ............... 386/280 |
| 2012/0331416 | A1* | 12/2012 | Barcay et al. ............... 715/782 |
| 2013/0007620 | A1 | 1/2013 | Barsook et al. |
| 2013/0080897 | A1 | 3/2013 | Han et al. |
| 2013/0091299 | A1 | 4/2013 | Wei et al. |
| 2013/0124990 | A1* | 5/2013 | Lettau ............... 715/716 |
| 2013/0124996 | A1* | 5/2013 | Margulis ............... 715/719 |
| 2013/0163962 | A1* | 6/2013 | Young ............... 386/280 |
| 2014/0108932 | A1 | 4/2014 | Soderstrom |

OTHER PUBLICATIONS

Wong, Curtis, "Interactive Narrative Content and Context for Visualization", Retrieved at << http://astro.uchicago.edu/cosmus/vizwork/UC%20final%20Curtis%20Wong.ppt >>, 2005, pp. 20.

Dinehart, Stephen E., "Dramatic Play: The Near-Future of Interactive Narrative", Retrieved at << http://narrativedesign.org/2010/04/dramaticplay/ >>, Apr. 27, 2010, pp. 1-9.

Joseph M. Joy et al., Data model and player platform for rich interactive narratives, U.S. Appl. No. 13/008,324, filed Jan. 18, 2011. pp. 56.

Narendranath Datha et al., Computer-assisted rich interactive narrative (RIN) generation, U.S. Appl. No. 13/008,484, filed Jan. 18, 2011. pp. 47.

Narendranath Datha et al., Authoring tools for rich interactive narratives, U.S. Appl. No. 13/008,732, filed Jan. 18, 2011. pp. 46.

Adobe Flash CS3 Professional, retrieved Mar. 28, 2008 from http://www.overstock.com/Electronics/Adoebe-Flash-CS3-Professional-Upgrade-Version-Product-Update-1-User-PC/2636812/product.html, pp. 4.

Benford, S., G. Giannachi, Temporal trajectories in shared interactive narratives, Proc. of the 2008 Conf. on Human Factors in Computing Systems, CHI 2008, Apr. 5-10, 2008, pp. 73-82, Florence, Italy.

Chavez, M. J., I. Conradi, L. Linyi, J. Telford, The 15th Int'l Symposium on Electronic Art, ISEA2009, Aug. 23-Sep. 1, 2009, University of Ulster, Northern Ireland.

Cheong, Y.-G., Y.-J. Kim, W.-H. Min, E.-S. Shim, J.-Y. Kim, Prism: A framework for authoring interactive narratives, Interactive Storytelling, Proc. of the First Joint Int'l Conf. on Interactive Digital Storytelling, ICIDS 2008, Nov. 26-29, 2008, pp. 297-308, Erfurt, Germany.

(56) References Cited

OTHER PUBLICATIONS

Chin, J., Lads tour authoring and playback system, Master Project Report, Brown University, Providence RI, May 20, 2011, pp. 1-16.
Davenport, G., S. Agamanolis, B. Barry, B. Bradley, K. M. Brooks, Synergistic storyscapes and constructionist cinematic sharing, IBM Systems Journal, 2000, vol. 39, No. 3&4, pp. 456-469.
Google, Google Earth, retrieved Oct. 7, 2008 from http://earth.google.com, pp. 1.
Gray, J., A. S. Szalay, The World Wide Telescope: An Archetype for Online Science, The Computing Research Repository (CoRR), Mar. 2004, pp. 4.
Hermann, T., H. Ritter, Sound and meaning in auditory data display, Proc. of the IEEE, vol. 92, No. 4, Apr. 2004, pp. 730-741.
International Digital Publishing Forum, EPUB 3 Overview, retrieved Oct. 19, 2011 from http://idpf.org/epub/30/spec/epub30-overview.html, pp. 24.
Jacobs, P., I. Bone, The need for interactive narrative in educational management simulations, Proc. of the 20th Annual Conf. of the Australasian Soc. for Comp. in Learning in Tertiary Education, Dec. 2003, pp. 618-623, Adelaide, Australia.
Jaffe, A., M. Naaman, T. Tassa, M. Davis, Generating summaries and visualization for large collections of geo-referenced photographs, Proc. of the 8th ACM SIGMM Int'l Workshop on Multimedia Information Retrieval, MIR 2006, Oct. 26-27, 2006, pp. 89-98, Santa Barbara, California, USA.
Kilfeather, E., J. McAuley, A. Corns, O. McHugh, An ontological application for archaeological narratives, 14th Int'l Workshop on Database and Expert Systems Applications, DEXA 2003, Sep. 1-5, 2003, pp. 110-114, Prague, Czech Republic.
Kjeldskov, J., J. Paay, Augmenting the city with fiction: Fictional requirements for mobile guides, Proc. of HCI in Mobile Guides, Mobile HCI 2007, Sep. 2007, pp. 1-6.
Klesen, M., M. Kipp, P. Gebhard, T. Rist, Staging exhibitions: Methods and tools for modelling narrative structure to produce interactive performances with virtual actors, Virtual Reality, Dec. 2003, vol. 7, No. 1, pp. 17-29.
Kopf, J., M. Uyttendaele, O. Deussen, M. F. Cohen, Capturing and viewing gigapixel images, ACM Trans. Graph., vol. 26, No. 3, Jul. 2007.
Koychev, I., R. Nikolov, D. Dicheva, SmatBook—A vision for the future e-book, 10th IFIP Working Conf. on Virtual Enterprises, Oct. 2009, pp. 8, Greece.
Li, M., M. Claypool, R. Kinicki, J. Nichols, Characterstics of streaming media stores on the web, ACM Transactions on Internet Technology, Nov. 2005, pp. 601-626, vol. 5, No. 4.
Magerko, B., Story representation and interactive drama, Proc. of the First Artificial Intelligence and Interactive Digital Entertainment Conf., AIIDE 2005, Jun. 1-5, 2005, pp. 87-92, Marina del Rey, California, USA.
Meier, J. D., F. Carlos, B. Prashant, B. Scott, R. Dennis, Quantifying end-user response time goals, Microsoft Pattern & Practices Developer Center, Chapter 14: Application Archetypes, Jan. 2008, 7 pages.
Microsoft, Digital narratives, retrieved Oct. 19, 2011 from http://www.digitalnarratvies.net/About.aspx, p. 1.
Microsoft, Microsoft Live Labs, Photosynth, retrieved Oct. 7, 2008 from http://photosynth.net, p. 1.
Microsoft, World-Wide Telescope, retrieved Oct. 7, 2008 from http://worldwidetelescope.org/, p. 1.
Min, W.-H., E.-S. Shim, Y.-J. Kim, Y.-G. Cheong, Planning-integrated story graph for interactive narratives, Proc. of the 2nd ACM Int'l Workshop on Story Representation, Mechanism and Context, Oct. 31, 2008, pp. 27-32, Vancouver, British Columbia, Canada.
Mulholland, P., T. D. Collins, Using digital narratives to support the collaborative learning and exploration of cultural heritage, 13th Int'l Workshop on Database and Expert Systems Applications, DEXA 2002, Sep. 2-6, 2002, pp. 527-531, Aix-en-Provence, France.
Nabian, N., C. Ratti, A. Biderman, G. Grise, MIT GEOblog: A platform for digital annotation of space for collective community based digital story telling, 3rd IEEE Int'l Conf. on Digital Ecosystems and Technologies, Jun. 2009, pp. 353-358.
PR Leap, MS team to create Microsoft Silverlight practice, Nov. 20, 2007, New Paltz, New York, pp. 2.
Qumu, Qumu Create, retrieved Oct. 19, 2011 from http://www.digitalvideo.de/Software/PDFpages/Qumu.pdf, pp. 5.
Qwiki, Qwiki Alpha, retrieved Nov. 16, 2010 from http://www.qwiki.com/, p. 1.
Setlur, V., A. Battestini, X. Ding, Travel scrapbooks: Creating rich visual travel narratives, Proc. of the 2009 IEEE Int'l Conf. on Multimedia and Expo, ICME 2009, Jun. 28-Jul. 2, 2009, pp. 1314-1317, New York City, NY, USA.
Sparacino, F., Narrative spaces: Bridging architecture and entertainment via interactive technology, 6th Int'l Conf. on Generative Art, Dec. 2002, pp. 15, Politecnico di Milano University, Milan, Italy.
Szilas, N., J.-H. Rety, Minimal structures for stories, Proc. of the 1st ACM Workshop on Story Representation, Mechanism and Context, Oct. 2004, pp. 25-32, ACM New York, NY, USA.
Tolva, J., MediaLoom: An interactive authoring tool for hypervideo, Nov. 1, 1998, http://www.ascentstage.com/medialoom/paper.html, pp. 16.
Ventura, D., D. Brogan, Digital storytelling with DINAH: Dynamic, interactive, narrative authoring heuristic, Entertainment Computing: Technologies and Applications, IFIP First International Workshop on Entertainment Computing, IWEC 2002, May 14-17, 2002, pp. 91-99, Makuhari, Japan.
Virtue, N., Embedding rich media in your pages: Video/Audio/SWF animation, retrieved Jun. 20, 2010, from http://helpdesk.mygazines.com/entries/186474-embedding-rich-media-in-your-pages-video-audio-swf-animation, Jun. 2, 2010, pp. 4.
Williams, D., I. Kegel, M. F. Ursu, N. Pals, A. Leurdijk, Experiments with the Production of ShapeShifting Media: Summary Findings from the Project NM2 (New Millennium, New Media), Proc. of the 4th Int'l Conf. on Virtual Storytelling, ICVS 2007, Dec. 2007, pp. 153-166, Saint-Malo, France.
Vu, Toan H., U.S. Office Action, U.S. Appl. No. 13/008,484, Sep. 11, 2014, pp. 1-17.
Wiener, Eric A., U.S. Final Office Action, U.S. Appl. No. 13/008,732, Aug. 4, 2014, pp. 1-18.
Kumar, Anil N., U.S. Office Action, U.S. Appl. No. 13/337,299, Aug. 28, 2014, pp. 1-17.
Debrow, J. J., U.S. Final Office Action, U.S. Appl. No. 13/327,802, Apr. 24, 2014, pp. 1-18.
Kumar, Anil M., U.S. Office Action, U.S. Appl. No. 13/337,299, Feb. 12, 2014, pp. 1-15.
Vu, Toan H., U.S. Final Office Action, U.S. Appl. No. 13/008,484, Nov. 6, 2013, pp. 1-17.
Vu, Toan H., U.S. Office Action, U.S. Appl. No. 13/008,484, May 23, 2013, pp. 1-13.
Wiener, Eric A., U.S. Office Action, U.S. Appl. No. 13/008,732, Jun. 24, 2014, pp. 1-13.
Debrow, James J., U.S. Office Action, U.S. Appl. No. 13/327,802, Aug. 2, 2013, pp. 1-16.
Zahr, Ashraf A., U.S. Notice of Allowance, U.S. Appl. No. 12/347,868, Jul. 7, 2011, pp. 1-5.
Zahr, Ashraf A., U.S. Office Action, U.S. Appl. No. 12/347,868, Mar. 4, 2011, pp. 1-4.
Vu, Toan H., U.S. Notice of Allowance, U.S. Appl. No. 13/008,324, filed Apr. 24, 2015, pp. 1-7.
Vu, Toan H., U.S. Final Office Action, U.S. Appl. No. 13/008,484, filed Jul. 6, 2015, pp. 1-25.
Kumar, Anil N., U.S. Office Action, U.S. Appl. No. 13/337,299, filed Apr. 16, 2015, pp. 1-17.
Vu, Toan H., U.S. Office Action, U.S. Appl. No. 13/008,324, filed Dec. 12, 2014, pp. 1-13.
Wiener, Eric a., U.S. Final Office Action, U.S. Appl. No. 13/008,732, filed Jan. 14, 2015, pp. 1-19.
Debrow, James J., U.S. Office Action, U.S. Appl. No. 13/327,802, filed Mar. 3, 2015, pp. 1-16.

* cited by examiner

EXPERIENCE STREAMS FOR RICH INTERACTIVE NARRATIVES

CROSS-REFERENCE TO RELATED APPLICATIONS

This application is a continuation-in-part of a prior application entitled "Generalized Interactive Narratives" which was assigned Ser. No. 12/347,868 and filed Dec. 31, 2008.

BACKGROUND

The linear, narrative method of conveying information has a long history that continues to this day. This method generally entails presenting information in a sequential manner. Verbal storytelling, classroom lectures, novels, text books, magazines, journals, slide presentations, movies, documentaries, how-to videos, online articles, and blogs, are but a few examples of linear narratives. However, narratives are not the only way information is currently conveyed. There is also interactive exploration.

Interactive exploration is often used for visualization of complex data. This method generally entails presenting information in an organized, often hierarchical manner, which allows a user to intelligently search through the data. Browsable maps in 2D and 3D are an example where interactive mapping software enables users to explore a vast space with customizable data layers and views. Another example is a Photosynth® which enables exploration of collections of images embedded in a re-created 3D space referred to as a "Synth". Yet another example is the so-called pivot control that enables a visually rich, interactive exploration of large collections of items by "pivoting" on selected dimensions or facets. These examples represent just a small number of the many interactive exploration schemes that exist today—and it is anticipated there will be many more developed in the future.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In general, various types of "Experience Streams" (ES), as described herein, are data constructs that are used by a "rich interactive narrative" (RIN) data model as basic building blocks that are combined in a variety of ways to enable or construct a large number of RIN scenarios for presenting interactive narratives to the user. Combinations of various ES types contain or have access to all the information required to define and populate a particular RIN, as well as the information (in the form of a series of user-navigable "states") that charts an animated and interactive course or path through each RIN. In addition, various ES types also provide UI controls and/or toolbars that enable user interaction along an interactive path representing the interactive narrative provided by each RIN. Examples of ES types include, but are not limited, content browser experience streams, zoomable media experience streams, relationship graph experience streams, player-controls/toolbar experience streams, etc. Depending upon the type of ES, each ES may be dynamically bound to data, such as the results of a query, particular images, text, videos, music, etc., along with the functionality to provide an interactive playback or display of that data. Note that the "interactive path" refers to a scripted evolution of the ES that represents a guided path that, at any time, can be paused allowing the user to explore the world represented by the RIN.

Each ES enables a "flythrough" or path through larger "environments" or "worlds" such as Virtual Earth®, Photosynth®, multi-resolution images, Web browser, and even "traditional media" such as images, audio, and video. Thus, the term "experience stream" or ES is used herein to refer to a scripted path through a specific "environment" and/or controls or toolbars for providing playback and/or interaction with the content being displayed, rendered, or otherwise presented by one or more ES during playback of the corresponding RIN for the user. Furthermore, the term "environment" is used herein to include images, video, and audio, as well as media that is organized in a more complex structure that defines the broader "world" accessible to the user via interaction with one or more of the ES associated with a particular RIN. Note that Virtual Earth®, Photosynth®, and Pivot® provide environments (e.g., a Photosynth® Synth) that are well known to those skilled in the art, and will not be described in detail herein.

Various types of ES have a viewport (either 2D or 3D, depending upon whether the display technology supports it) through which the stream is experienced (i.e. displayed to the user while allowing for user interaction), as well as, optionally, 2D or 3D audio specific to that stream. Various types of ES also support user pause-and-explore type operations while interacting with various RINs. Further, an ES may not have a 2D viewport—it may just consist of audio (such as a voiced-over narrative, or a background score). Finally, an ES may also represent a toolbar or control, for enabling actions such as volume control, audio or video playback, pause and explore operations, etc. Therefore, experience streams or "ES" can be considered, in part, as "plugins", each of which encapsulate particular visualization and interaction technologies for enabling construction of RINs, along with the data, information, or links to that data or information that is be presented to the user during RIN playback.

Conceptually, an Experience Stream or ES is generally composed of "Data Bindings," which collectively define the environment or world through which a flythrough or viewing of the RIN is presented, and a "Trajectory" which defines the flythrough experience itself. The content of each RIN is dynamically generated by using one or more ES to define "information states" associated with various points along the scripted path of each RIN. RINs are then synthesized by automatically generating content based on the various ES and information states defined for each RIN.

In other words, the RIN data model uses various ES to provide an extensible specification and platform for the orchestration of multiple visualization technologies to create rich and compelling interactive narratives. ES are composed and/or combined to play or display interactive linear segments of the RIN. Typically the focus at any point of time is on a single ES (such as a walk through a Synth), with the other ES playing secondary roles, such as, for example adding overlay video or a narrative track, though which ES is the focus at any time will typically change during playback as the user interacts with the RIN.

In view of the above summary, it is clear that the "experience streams" described herein provide basic building blocks for enabling and constructing "rich interactive narratives" or RINs. In addition to the just described benefits, other advantages of the various ES described herein will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction

In general, various types of "Experience Streams" (ES), as described herein are data constructs that are used by a "rich interactive narrative" (RIN) data model as basic building blocks that are combined in a variety of ways to enable or construct a large number of RIN scenarios for presenting interactive narratives to the user. Combinations of various ES types contain or have access to all the information required to define and populate a particular RIN, as well as the information that charts an animated and interactive course or path through each RIN. In addition, various ES types also provide UI controls and/or toolbars that enable user interaction along the interactive path representing the interactive narrative provided by each RIN.

Examples of ES types include, but are not limited, content browser experience streams, zoomable media experience streams, relationship graph experience streams, player-controls/toolbar experience streams, etc. Depending upon the type of ES, each ES may be dynamically bound to data, such as the results of a query, particular images or text, videos, music, etc., along with the functionality to provide a playback or display of that data during playback of the RIN. Note that RINs are generally introduced below to put the use and implementation of the various ES described herein into an understandable context.

In general, a RIN is composed of the following elements:
1. A list of Scenes. Each Scene is analogous to a scene in a DVD movie. Scenes are a purely sequentially-running chunk of the RIN. Scene boundaries may disappear when running a RIN from end to end, but in general navigation among Scenes can be non-linear.
2. A Start Scene. This is typically a "menu" Scene that is a launching point for the RIN, analogous to the menu of a DVD movie.
3. A list of Experience Streams (ES). Each ES enables a "flythrough" or path through "environments" such as Virtual Earth®, Photosynth®, multi-resolution images, Web browser, and even "traditional media" such as images, audio, and video. Furthermore, the term "environment" is used herein to include any combination of images, video, and audio.
4. A list of layout constraints. Layout constraints among the ES viewports, indicate z-order and 2D or 3D layout preferences, as well as constraints that specify how to mix audio from multiple ESs. These constraints enable the proper use of both screen real estate and audio real estate by the various ES used by a particular RIN when the RIN is playing.

Each Scene is composed of a list of RIN Segments. Metadata in a Segment orchestrates when each particular ES becomes visible or audible and when they disappear. Segments may also include additional metadata. For example, metadata of a Segment may specify that a subsection of an ES is to be played, or that interactivity capabilities of the ES should be enabled or disabled relative to some user interaction or to some point that is reached during playback of the RIN. Segment metadata also bind user actions to ES viewports—such as, clicking on a viewport may cause a jump to another Scene, or make some other ES appear or disappear. Segments enable a variety of features of RIN, including non-linear jumps, annotations and simple interactivity. Each ES may also be viewable, audible, or otherwise accessible across multiple Scenes to enable seamless transitions between Scenes, as happens in the scenes of a movie.

Various types of ES have a viewport (either 2D or 3D, depending upon whether the display technology supports it) through which the stream is experienced, as well as, optionally, audio specific to that stream. Various types of ES also support user pause-and-explore type operations while interacting with various RINs. Further, an ES may not have a viewport—it may just consist of audio (such as, for example, a voiced-over narrative, or a background score). In addition, an ES may also represent a toolbar or control, for enabling actions such as volume control, audio or video playback, pause and explore operations, etc. Finally, each ES may contain "provider information" that binds the ES to code that understands and is capable of rendering or displaying the specific experience stream. A simple example of this would be media player code that is bound to an ES to allow that ES to provide playback of one or more types of media (e.g., audio, video, etc.).

1.1 System Overview

Figure 1:
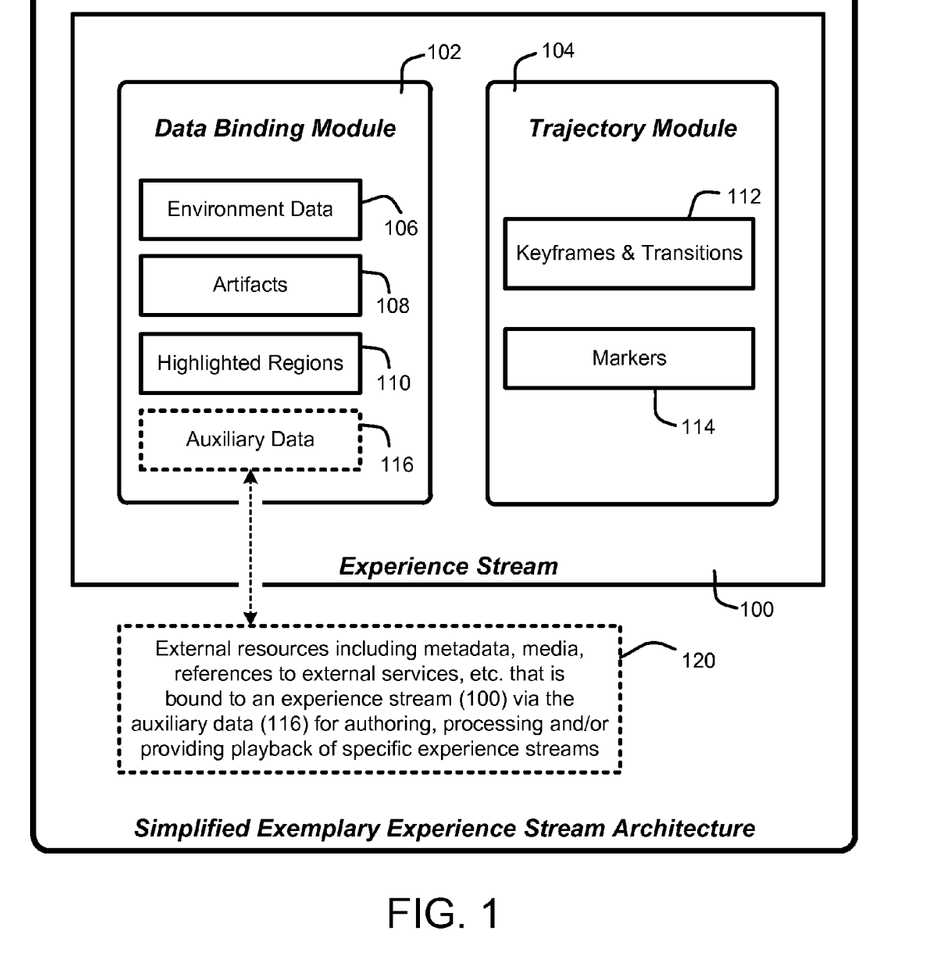
FIG. 1 illustrates a simplified diagram of an "Experience Stream" or "ES," made up of "data bindings" and a "trajectory", wherein the data bindings include "environment data", as well as "artifacts", "highlighted regions" and optional "auxiliary data", and wherein the trajectory includes "keyframes", "transitions", and "markers", as described herein.

As noted above, the various types of ES provide basic building blocks for enabling and constructing "rich interactive narratives", or RINs, for playback to the user. The processes summarized above are illustrated by the general system diagram of FIG. 1. In particular, the system diagram of FIG. 1 illustrates the interrelationships between program modules for implementing various ES embodiments, as described herein. Furthermore, while the system diagram of FIG. 1 illustrates a high-level view of various ES embodiments, FIG. 1 is not intended to provide an exhaustive or complete illustration of every possible embodiment of the ES as described throughout this document.

In addition, it should be noted that any boxes and interconnections between boxes that may be represented by broken or dashed lines in FIG. 1 represent alternate embodiments of the ES described herein, and that any or all of these alternate embodiments, as described below, may be used in combination with other alternate embodiments that are described throughout this document.

In general, as illustrated by FIG. 1, in one embodiment, an experience stream 100 or ES is made up of "data bindings" 102 and a "trajectory" 104. The data bindings include environment data 106, as well as artifacts 108 and highlighted regions 110. The trajectory includes "keyframes" and "transitions" 112 and "markers" 114. An experience stream 100 can also include optional "auxiliary data" 116 within the data bindings 102 as discussed in further detail in Section 2. Note that keyframes are optional. In particular, keyframes are desirable to structure how the experience stream evolves as a function of narrative time. However, an experience stream can be constructed where the information that describes how the experience stream evolves as a function of narrative time is contained in an ES-specific format within the Auxiliary Data of the ES itself. Further, an experience stream can have an "empty trajectory" such that it contains no keyframes or trajectory elements.

For example, this auxiliary data 116 can include "provider information" and other world or environment data binding information. Provider information is used in processes that render RINs, as well processes that enable authoring or processing of RINs, to bind to code that understands the specific experience stream (i.e., that understands the specific environment through which the experience is streaming). In other words, the auxiliary data 116 may include references to external resources 120 including any or all of metadata, media, references to external services, external code, DLLs, applications, etc., that is bound to an experience stream 100 via the auxiliary data for authoring, processing and/or providing playback of specific experience streams. A simple example of this would be a media player type ES where the ES is bound to external resources or code that is capable of providing playback of one or more types of media (e.g., audio, video, etc.). As discussed in further detail in Section 2, the world or environment data binding information defines a concrete instance of the environment over which each experience streams runs.

As discussed in further detail in Section 2, examples of ES types include, but are not limited to content browser experience streams, zoomable media experience streams, relationship graph experience streams, player-controls/toolbar experience streams, etc.

2.0 Operational Details of Experience Streams (ES)

The above-described program modules are employed for implementing various ES embodiments. As summarized above, the various types of ES provide basic building blocks for enabling and constructing "rich interactive narratives", or RINs for playback to the user. The following sections provide a detailed discussion of the operation of various embodiments of the ES, and of exemplary methods for implementing the various types of ES introduced in Section 1 with respect to FIG. 1. In particular, the following sections provide examples and operational details of various embodiments of the ES, including: an operational overview of ES streams; the RIN data model; formal definitions and discussions of ES; ES projections; types of ES; designing various ES; and examples of using various ES in combination.

2.1 Operational Overview

"Experience Streams" (ES) are used by a "rich interactive narrative" (RIN) data model as basic building blocks that are combined in a variety of ways to enable or construct a large number of RIN scenarios for playback to the user. In general various ES types contain all the information required to define and populate a particular RIN, as well as the information (in the form of a series of navigable states) that charts an animated and interactive course through each RIN. In other words, combinations of various ES provide a scripted path through an environment, as well as various UI controls and/or toolbars that enable user interaction with the interactive narrative provided by each RIN. Examples of the various types of ES include, but are not limited, content browser experience streams, zoomable media experience streams, relationship graph experience streams, player-controls/toolbar experience streams, etc.

2.2 RIN Data Model

In general, embodiments of the rich interactive narrative (RIN) data model described herein are made up of abstract objects that can include, but are not limited to, narratives, segments, screenplays, resource tables, experience streams, sequence markers, highlighted regions, artifacts, keyframe sequences and keyframes. The sections to follow will describe these objects and the interplay between them in more detail. Note also that the RIN data model and an associated player platform for use in use in implementing and interacting with RIN's are described in further detail in the co-pending U.S. patent application entitled "DATA MODEL AND PLAYER PLATFORM FOR RICH INTERACTIVE NARRATIVES", Ser. No. 13/008,324, filed on Jan. 18, 2011, the subject matter of which is incorporated herein by this reference.

2.2.1 The Narrative And Scenes

The RIN data model provides seamless transitions between narrated guided walkthroughs of arbitrary media types and user-explorable content of the media, all in a way that is completely extensible. In the abstract, the RIN data model can be envisioned as a narrative that runs like a movie with a sequence of scenes that follow one after another (although like a DVD movie, a RIN could be envisioned as also having isolated scenes that are accessed through a main menu). However, unlike a movie, the user can stop the narrative, explore one or more environments associated or linked to the current scene (or other scenes if desired), and then resume the original narrative where it left off.

A scene is a sequentially-running chunk of the RIN. As a RIN plays end-to-end, the boundaries between scenes may disappear, but in general navigation among scenes can be non-linear. In one implementation, there is also a menu-like start scene that serves as a launching point for a RIN, analogous to the menu of a DVD movie.

However, a scene is really just a logical construct. The actual content or data that constitutes a linear segment of a narrative is contained in objects referred to herein as RIN "segments." In general, a scene of a RIN can be composed of a single RIN segment, or it can be put together using all or portions of multiple segments, some of which can also be part of one or more different scenes. Thus, a scene can be thought of as references into content that is actually contained in RIN segments. Further, it is possible for a scene from one RIN to reference RIN segments from other RINs. This feature can be used, for example, to create a lightweight summary RIN that references portions of other RINs. Still further, one RIN segment may play a first portion of an experience stream while the next RIN segment plays a remaining portion of that experience stream. The capability of experience streams to extend past the boundaries of segments or scenes can be used to enable seamless transitions between scenes, as happens in the scenes of a movie.

In one embodiment of the RIN data model, a provision is also made for including auxiliary data (as discussed above with respect to FIG. 1). All entities (e.g., scenes, segments, experience streams, etc.) in the RIN data model allow arbitrary auxiliary data to be added to that entity. This data can include, for example (but without limitation), the following. It can include metadata used to describe any other data associated with one or more entities. It can also include data that fleshes out the entity, which can include experience-stream specific content. For example, a keyframe entity (i.e., a sub-component of an experience stream, both of which will be described later) can contain experience-stream-specific data that captures the state of the environment at a point in time. The auxiliary data can also be data that is simply tacked on to a particular entity for purposes outside the scope of the RIN data model. This data may be used by various tools that process and transform RINs, in some cases for purposes quite unrelated to playing of a RIN.

For example, the RIN data model can be used to represent annotated regions in video, and there could be auxiliary data that assigns certain semantics to these annotations (such as, for example, by identifying a "high risk" situation in a security video), that are intended to be consumed by some service that uses this semantic information to make some business workflow decision (such as, for example, precipitate a security escalation). The RIN data model uses a dictionary entity referred to herein as "Auxiliary Data" to store all the above types of data. In the context of the narrative, metadata that is common across the RIN segments, such as, for example, descriptions, authors, and version identifiers, are stored in the narrative's Auxiliary Data entity.

2.2.2 RIN Segments

A RIN segment contains references to all the data necessary to orchestrate the appearance and positioning of individual experience streams for a linear portion of a RIN. In general, the highest level components of the RIN segment include one or more experience streams (in the form of the streams themselves, or references or links to where the streams can be obtained), at least one screenplay and a resource table. The RIN segment can also include arbitrary auxiliary data as described previously.

In one implementation, a RIN segment takes the form of a 4-tuple (S, C, O, A). S is a list of references to experience streams; C (which is associated with the screenplay) is a list layout constraints that specify how the experience streams share display screen and audio real estate; O (which is also associated with the screenplay) is a set of orchestration directives (e.g., time coded events); and A (which is associated with the resource table) is a list of named, time coded anchors, used to enable external references.

In general, the experience streams are composed to play a linear segment of the narrative. Each experience stream includes data and or controls, toolbars and players that enable traversing a particular environment. Experience streams can play sequentially, or concurrently, or both, with regard to other experience streams. However, the focus at any point of time is typically on a single experience stream (such as a walk through a Photosynth® Synth), with other concurrently playing streams having secondary roles (such as adding overlay video or a narrative track). Experience streams will be described in more detail beginning in Section 2.3.

In general, a screenplay is used to orchestrate the experience streams, dictating their lifetime, how they share screen and audio real estate, and how they transfer events among one another. Only one screenplay can be active at a time. However, in one implementation, multiple screenplays can be included to represent variations of content. For example, a particular screenplay could provide a different language-specific or culture-specific interpretation of the RIN segment from the other included screenplays.

More particularly, a screenplay includes orchestration information that weaves multiple experience streams together into a coherent narrative. The screenplay data is used to control the overall sequence of events and coordinate progress across the experience streams. Thus, it is somewhat analogous to a movie script or an orchestrator conductor's score. The screenplay also includes layout constraints that dictate how the visual and audio elements from the experience streams share display screen space and audio real estate as a function of time. In one implementation, the screenplay also includes embedded text that matches a voiceover narrative, or otherwise textually describes the sequence of events that make up the segment. It is also noted that a screenplay from one RIN segment can reference an experience stream from another RIN, thereby allowing that ES to be incorporated into the screenplay making the reference.

However, the orchestration information associated with the screenplay can go beyond simple timing instructions such as specifying when a particular experience stream starts and ends. For example, this information can include instructions whereby only a portion of an experience stream is played rather than the whole stream, or that interactivity capabilities of the experience stream be enabled or disabled. Further, the screenplay orchestration information can include data that enables simple interactivity by binding user actions to an experience stream. For example, if a user "clicks" on prescribed portion of a display screen, the screenplay may include an instruction which would cause a jump to another RIN segment in another scene, or to shut down a currently running experience stream. Thus, the screenplay enables a variety of features, including non-linear jumps and user interactivity.

An experience stream generally presents a scene from a virtual "viewport" that the user sees or hears (or both) as he or she traverses the environment. For example, in one implementation a 2D viewport is employed with a pre-defined or user configurable aspect ratio, through which the experience stream is presented to the user, as well as, optionally, audio specific to that stream is heard. As such, it should be understood that the term viewport is used loosely, as there may not be any viewing involved. For example, the environment may involve only audio, such as a voiced-over narrative, or a background score.

With regard to the layout constraints, the screenplay includes a list of these constraints which are applicable to the aforementioned viewports created by the experience streams involved in the narrative. In general, these layout constraints indicate a z-order and/or 2D layout preferences for the viewports, as well as their relative sizes. For example, suppose four different experience streams (ES1, ES2, ES3 and ES4)

are running concurrently at a point in time in a narrative. Layout constraints for each experience stream dictate the size and positioning of each experience stream's viewport.

Figure 2:
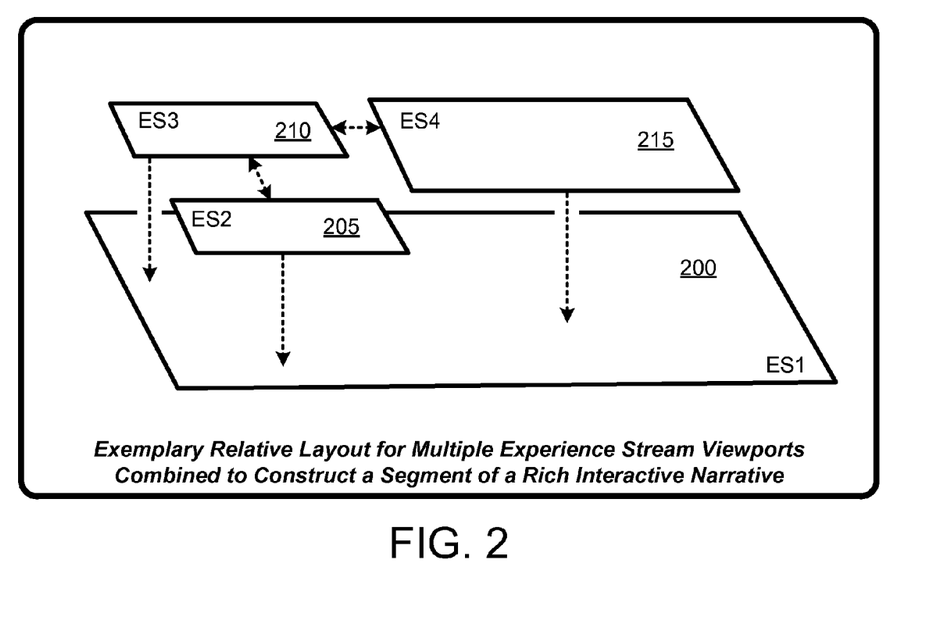
FIG. 2 provides an exemplary layout (e.g., relative positions and size) for multiple experience streams viewports that have been combined to construct a segment of a "rich interactive narrative" or "RIN", as described herein.

Referring to FIG. 2, an exemplary configuration of the experience stream viewports for each of the four experience streams (ES1 200, ES2 205, ES3 210 and ES4 215) is shown relative to each other (with relative positioning indicated by broken lines). In addition, in implementations where audio is involved, the layout constraints specify how to mix the audio from potentially multiple experience streams. These constraints enable the proper use of both screen real estate and audio real estate when the RIN is playing. Further, in one implementation, the relative size and position of an experience stream viewport can change as a function of time. In other words, the layout can be animated or dynamic during playback of the RIN.

Thus, each experience stream provides a portal into a particular environment. In other words, the experience stream projects a view onto the viewer's screen (or more generically, onto whatever presentation platform is being used) and sound system. A narrative is crafted by orchestrating multiple experience streams into a storyline. The RIN segment screenplay includes layout constraints that specify how multiple experience stream viewports share screen and audio real estate as a function of time.

In one implementation, the layout constraints also specify the relative opacity of each experience stream's viewport. Enabling experience streams to present a viewport with transparent backgrounds give great artistic license to authors of RINs. In one implementation, the opacity of a viewport is achieved using a static transparency mask, designated transparent background colors, and relative opacity levels. It is noted that this opacity constraint feature can be used to support transition functions, such as fade-in/fade-out.

With regard to audio layout constraints, in one implementation, these constraints are employed to share and merge audio associated with multiple experience streams. This is conceptually analogous to how display screen real estate is to be shared, and in fact, if one considers 3D sound output, many of the same issues of layout apply to audio as well. For example, in one version of this implementation a relative energy specification is employed, analogous to the previously-described opacity specification, to merge audio from multiple experience streams. Variations in this energy specification over time are permissible, and can be used to facilitate transitions, such as audio fade-in/fade-out that defines a state change from one scene to the next.

As for the aforementioned resource table, it is generally a repository for all, or at least most, of the resources referenced in the RIN segment. All external Uniform Resource Identifiers (URIs) referenced in experience streams are placed in resource table entries. Resources that are shared across experience streams are also resource table entries. For example, a simple exemplary implementation of the resource table may include reference metadata that enables references to external media (e.g., video, standard images, gigapixel images, etc.), or even other RIN segments. In some implementations, the metadata also includes information for intelligently scheduling content downloads (e.g., download a video stream when it is likely that the user will be viewing that video stream based on current user interaction with the RIN); choosing among multiple options (e.g., video resolution and/or audio fidelity) if bandwidth becomes a constraint; and pausing a narrative in a graceful manner if there are likely going to be delays due to ongoing content uploads.

2.2.3 RIN Implementation Environment

An instance of a RIN constructed in accordance with the previously-described data model is captured in a RIN document or file. This RIN document is considered logically as an integral unit, even though it can be represented in units that are downloaded piecemeal, or even assembled on the fly, based on the various ES and associated trajectories used to construct the RIN.

A RIN document can be generated in any number of ways. For example, it could be created manually using an authoring tool. It could be created automatically by a program or service. Or it could be some combination of the above. Note that specifics details on how RIN documents are authored are beyond the scope of this application, and are thus only described generally herein.

RIN documents, once authored are deposited with one or more RIN providers. The purpose of a RIN provider is to retain and provide RINs, on demand, to one or more instances of a RIN player. While the specifics on the operation of a RIN provider is beyond the scope of this application, it is noted that in one implementation, a RIN provider has a repository of multiple RINs and provides a search capability a user can employ to find a desired RIN. A RIN player platform for playing RINs is described in more detail in the sections to follow.

In general, RIN authorers, RIN providers and RIN players are in communication over a computer network, such as the Internet or a proprietary intranet or other wired or wireless network. However, this need not be the case. For example, in other implementations any one or more of the RIN authorers, RIN providers and RIN players can reside locally, e.g., on a single computing device or some local storage media accessible to that computing device, such that communications between them is direct, rather than through a computer network.

2.3 RIN Experience Streams (ES)

As noted above, there are a variety of types of experience streams or "ES" that can be combined in various ways to construct a RIN. Examples of these ES include, but are not limited to, content browser experience streams, zoomable media experience streams, relationship graph experience streams, player-controls/toolbar experience streams, etc.

In general, as described in Section 2.2, a RIN data model uses one or more of these pluggable ES to create each RIN. Depending upon the type of experience stream, each experience stream may be dynamically bound to data, such as the results of a query, particular images or text, videos, music, etc. The data in an ES defines an environment and how that environment evolves as logical time progresses.

More specifically, the term "experience stream" or "ES" is generally used to refer to a scripted path through a specific environment, as well as optionally how the environment itself evolves as the path is traversed. The environment can include various user-interactive controls and/or toolbars that enable user interaction with the environment represented by each ES in the RIN. In addition, various experience streams support pause-and-explore aspects of a RIN. For example, in one embodiment, discussed above with respect to FIG. 1, an experience stream 100 is made up of data bindings 102 and a trajectory 104. The data bindings include environment data 106, as well as artifacts 108, highlighted regions 110, and auxiliary data 116. The trajectory includes keyframes and transitions 112 and markers 114. An experience stream can also include auxiliary data 116 and one or more controls or toolbars as noted above. Note that a variety of exemplary types of experience streams are described in detail in Section 2.4.

For example, this auxiliary data 116 can include provider information and world or environment data binding information. Provider information is used in processes that render RINs, as well processes that enable authoring or processing of RINs, to bind to resources or code that understands the specific experience stream (i.e., that understands the specific environment through which the experience is streaming). The world or environment data binding information defines the concrete instance of the environment over which the experience streams runs.

Formally, in one implementation, an experience stream is represented by a tuple (E, T, A), where E is environment data (also referred to herein as "world data" or "environment data"), T is the trajectory (which includes a timed path and viewport-to-world or -environment mapping parameters, as described below), and A refers to any artifacts and region highlights embedded in the environment (as will also be described shortly).

Data bindings refer to static or dynamically queried data that defines and populates the environment through which the experience stream runs. Data bindings include environment data (E), as well as added artifacts and region highlights (A). Together these items provide a very general way to populate and customize arbitrary environments, such as Virtual Earth®, Photosynth® (i.e., creates 3D world or region referred to as a "Synth" from large numbers of images of a scene), multi-resolution images, and even "traditional media" such as images, audio, and video. However, these environments also include domains not traditionally considered as "worlds" or "environments", but which are still nevertheless very useful in conveying different kinds of information. For example, the environment can be a web browser; the World Wide Web, or a subset, such as the Wikipedia; 2D animated scalable vector graphics with text; or a text document; to name a few.

Consider a particular example of data bindings for an "image experience stream" in which the environment is an image of any size, including potentially very large images such as gigapixel images. An image experience stream enables a user to traverse an image, embedded with objects that help tell a story. In this case the environment data defines the image. For example, the environment data could be obtained by accessing a URL pointing to a location where the image is being hosted. Artifacts (discussed in further detail below) are objects logically embedded in the image, perhaps with additional metadata. Finally, "highlights" identify regions within the image and can change as the narrative progresses. These regions may or may not contain artifacts.

Artifacts and highlights are distinguished from the environment data as they are specifically included to tell a particular story that makes up the narrative. Both artifacts and highlights may be animated or dynamically positioned, and their visibility may be controlled as the narrative RIN segment progresses, or in response to ongoing user interaction with the RIN. Artifacts and highlights are embedded in the environment (such as in the underlying image in the case of the foregoing example), and therefore will be correctly positioned and rendered as the user explores the environment. It is the responsibility of an experience stream renderer to correctly render these objects. It is also noted that the environment may be a 3D environment, in which case the artifacts can be 3D objects and the highlights can be 3D regions.

It is further noted that artifacts and region highlights can serve as a way to do content annotation in a very general, extensible way. For example, evolving regions in a video or Photosynth® can be annotated with arbitrary metadata. Similarly, portions of images, maps, and even audio could be marked up using artifacts and highlights (which can be a sound in the case of audio).

There are several possibilities for locating the data that is needed for rendering an experience stream. This data is used to define the world or environment being explored, including any embedded artifacts. The data could be located in several places. For example, the data can be located within the aforementioned auxiliary data of the experience stream itself. The data could also be one or more items in the resource table associated with the RIN segment. In this case, the experience stream would contain resource references to items in the table. The data could also exist as one or more external files referenced by URLs, or returned in response to a dynamic query to an external service, which may be a front for a database, such as a search engine. It is noted that it is not intended that the data be found in just one of these locations. Rather the data can be located in any combination of the foregoing locations, as well as other locations, as desired.

The aforementioned "trajectory" of an ES is defined by a set of "keyframes". However, as noted above, an experience stream can have an empty trajectory (e.g., zero or more keyframes). Each keyframe captures the state of the experience stream at a particular point of time. These times may be in specific units (say seconds), relative units (run from 0.0 to 1.0, which represent start and finish, respectively), or can be gated by external events (say some other experience stream completing). Keyframes in RINs capture the "information state" of an experience stream (as opposed to keyframes in, for instance, animations, which capture a lower-level visual layout state). An example of an "information state" for a map experience stream would be the world coordinates (e.g., latitude, longitude, elevation) of a region under consideration, as well as additional style (e.g., aerial, road, street view, etc.) and camera parameters (e.g., angle, tilt, etc.). Another example of an information state, this time for a relationship graph experience stream, is the graph node under consideration, the properties used to generate the neighboring nodes, and any graph-specific style parameters.

Each keyframe also represents a particular environment-to-viewport mapping at a particular point in time. In the foregoing image example, the mappings are straightforward transformations of rectangular regions (or regions having any desired shape) in the image to the viewport (for panoramas, the mapping may involve angular regions, depending on the projection). For other kinds of environments, keyframes can take on widely different characteristics.

The keyframes are bundled into keyframe sequences that make up the aforementioned trajectory through the environment. Trajectories are further defined by transitions, which define how inter-keyframe interpolations are done. Transitions can be broadly classified into smooth (continuous) and cut-scene (discontinuous) categories. Further, the interpolation/transition mechanism for each keyframe sequence can vary from one sequence to the next.

A keyframe sequence can be thought of as a timeline, which is where another aspect of a trajectory comes into play—namely "markers". Markers are embedded in a trajectory and mark a particular point in the logical sequence of a narrative. They can also have arbitrary metadata associated with them. Markers are used for various things, such as indexing content, semantic annotation, as well as generalized synchronization and triggering. For example, context indexing is achieved by searching over embedded and indexed sequence markers. Further, semantic annotation is achieved by associating additional semantics with particular regions of content (e.g., a particular "region" of a video of a baseball game may be a ball in play, or a region of a map may be the location of a particular facility). A trajectory can also include markers that act as logical anchors that refer to external references. These anchors enable named external references to be brought into the narrative at pre-determined points in the trajectory.

Still further, a marker can be used to trigger a decision point where user input is solicited and the narrative (or even a different narrative) proceeds based on the user input. For example, consider a RIN that provides a medical overview of the human body. At a point in the trajectory of an experience stream running in the narrative that is associated with a marker, the RIN is made to automatically pause and solicit whether the user would like to explore a body part (e.g., the kidneys) in more detail. If the user then indicates he or she would like more in-depth information about the kidneys, and a separate RIN (or experience stream) concerning human kidneys is loaded and played.

A trajectory through a Photosynth® Synth is easy to envision as a tour through the depicted environment. It is less intuitive to envision a trajectory through other environments such as a video or an audio only environment. As for a video, a trajectory through the world or environment of a video may seem redundant, but consider that this can include a Ken Burns style pan-zoom dive into subsections of video, perhaps slowing down time to establish some point. Similarly, one can conceive of a trajectory through an image, especially a very large image, as panning and zooming into portions of an image, possibly accompanied by audio and text sources registered to portions of the image.

A trajectory through a pure audio stream may seem contrived at first glance, but it is not always so. For example, a less contrived scenario involving pure audio is an experience stream that traverses through a 3D audio field, generating multi-channel audio as output. Pragmatically, representing pure audio as an experience stream enables manipulation of things like audio narratives and background scores using the same primitive (i.e., the experience stream) as used for other media environments. Note also that the corresponding ES viewport need not be restricted to 2D and stereo audio. In other words, ESs can make use of 3D displays, multi-channel sound and even haptic interfaces as ways to more fully experience the ES.

It is important to note that a trajectory can be much more than a simple traversal of an existing (pre-defined) environment. Rather, the trajectory can include information that controls the evolution of the environment itself that is specific to the purpose of the RIN. For example, the animation (and visibility) of artifacts is included in the trajectory. The most general view of a trajectory is that it represents the evolution of a user experience—both of the underlying model and of the users view into that model.

Figure 3:
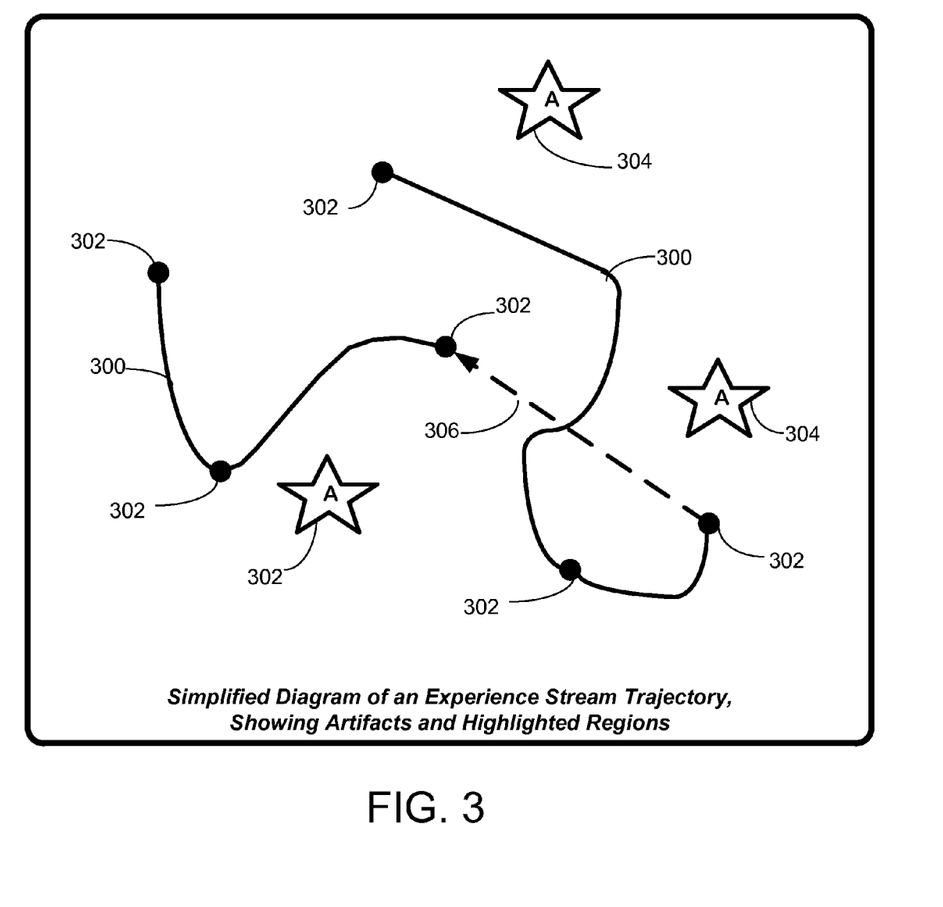
FIG. 3 provides a simplified diagram of an experience stream trajectory along with artifacts and highlighted regions, as described herein.

In view of the foregoing, an exemplary experience stream can be illustrated as shown in FIG. 3. The bolded graphics illustrate a trajectory 300 along with multiple markers 302. The stars indicate artifacts or highlighted regions 304. The dashed arrow 306 represents a "hyper jump" or "cut scene", i.e., an abrupt transition, illustrating that an experience stream is not necessarily restricted to a continuous path through an environment. Note that the data model itself can evolve as part of the trajectory—it's not just a flythrough, but rather a series of states that define both a flythrough as well as possible evolution of the world itself.

2.4 ES Projections

As discussed above, various types of ES provide a fly through an arbitrary world or environment. However, an environment that exists at the point the fly through is originally authored is not guaranteed to exist when the fly through is actually viewed by the user. However, even if that environment still exists, it may be impractical to render it in real time. These issues could occur for a variety of reasons, such as because much time (and evolution of technology) has passed in the interim, or because the conditions of viewing (e.g., using a third-party mobile device over a limited bandwidth network) may be much different than where the world or environment exists. One solution to this problem is to create an "ES Projection" and use that as a back-up for the ES in situations where it is impossible or impractical to render the ES when the RIN is being played.

In general, an "ES Projection" is a transformed version of an ES. The ES Projection is a flythrough of a "simplified" world or environment composed of standardized multimedia elements such as video, pictures, audio and text, as well as either keyframes or metadata that enables synchronization of this transformed fly through with the original world or environment (or some form of the original world) when the user would like to take over the controls and explore the world.

In one embodiment, after a RIN is authored, one or more selected ES can be pre-rendered into video or audio with image slideshows. Thus for selected ESs, alternative, projected versions of the ES is created. A second version of the RIN is then created where for these selected ESs, their corresponding projected ES is also included in the RIN. Metadata in the Screenplay identifies the projected ES (if any) for each ES. When the latter RIN plays, for the selected ES, the player may choose to render the projected ES instead of its original ES. It can do this based on determination that bandwidth consideration is insufficient, or if the provider for the original ES is simply not available at the time of playing, or if the data referenced at the time of creation is no longer available. When the RIN is paused at a certain point the narrative, for user exploration, the player switches out (hides) the projected ES and if available, brings in (shows) the original ES, synched to the appropriate point in logical narrative time.

For example, if the original ES is a fly through a particular Photosynth® Synth (i.e., a rendered Photosynth® environment) embellished with embedded audio artifacts, the ES Projection can be a pre-rendered video of the flythrough, with metadata that encodes the trajectory of the flythrough. Consequently, this type of ES Projection can be viewed even on a platform that does not support Photosynth®; however, in this case the exploration capability would not be supported. If the Photosynth® Synth exists (perhaps in some future form 5 years hence), the original metadata is (or should be) sufficient to synchronize the path (specified by the original ES) with the Synth to enable pause and exploration. This metadata is a set of "Anchors" into the world or environment provided by the RIN. For example, one such anchor may be a link to a particular external database or website that contains information used to construct the RIN. Consequently, if that external database or website is updated at some point, viewing a RIN having an ES with an anchor to that external database or website will cause the RIN to be dynamically updated on playback.

An ES Projection is technically a transformation of an ES into an arbitrary "simpler" ES. In one embodiment, the simpler ES is composed of standard media elements, including, but not limited to:

1. Pre-rendered video of the original trajectory (with audio, if applicable), in multiple resolutions;
2. Time coded images extracted at key points in the trajectory, in multiple resolutions, with accompanying audio track;

3. Time coded text or 2D graphics.

As with any ES, there is an included trajectory that flies through these elements. In general, various embodiments of the RIN data model include the capability to render any arbitrary ES into an ES Projection that can then be viewed or displayed or played back by any RIN viewer. Thus, no matter how exotic and transient the original ES and its underlying world or environment, its corresponding ES projection will be viewable for the foreseeable future, regardless of changes in the underlying technology.

Finally, one special case application of ES projections is to encapsulate an entire RIN within a "RIN in RIN ES" (see Section 2.5.7), and then to render that into a video or slideshow with audio. This enables the generation of videos and/or slideshows from RINs. In other words, the RIN platform described herein can be used as a video and/or slideshow generation platform.

2.5 Predefined Types Of Experience Streams

As noted above, there are a variety of types of experience streams or ES that can be combined in various ways to construct a RIN. These types can be predefined, or constructed to provide custom features, as desired. Examples of predefined ES include, but are not limited, content browser experience streams, zoomable media experience streams, relationship graph experience streams, player-controls/toolbar experience streams, etc. Note that although the type and format of a particular ES may be predefined, it is still the responsibility of the RIN authorer to tie the desired content to the ES via the use of appropriate data bindings and trajectories, as discussed above. Examples of a few of the many types of predefined experience streams that can be used to construct each RIN are discussed below.

2.5.1 Content Browser ES

A "content browser" experience stream presents a list or array of items, whose content may be actionable. For example, clicking on or otherwise selecting any of the items in a content browser experience stream produces a configurable action. The content browser ES can present these items in various styles, including a 2D grid, a set of columns, a 1D list (vertical or horizontal) or a carousel. The content browser experience stream is useful for purposes such as, for example, letting a user browse collections of items, and also to search for content in one or more databases, networks, the Internet, or even the user's local computing device upon which the RIN is being presented to the user. As with any ES, the content browser ES is scriptable, i.e., as with any ES, the content browser experience stream can be part of a guided tour or walkthrough of a RIN. The "information state" (represented optionally as a keyframe) would include which items in the content browser are visible, and which items (if any) are highlighted.

When the RIN is in "play" (i.e., guided tour) mode, content browser experience streams are useful for giving a commentary over a collection of items, either to give the user a sense of what is there, or to pick a few to highlight as examples, or as part of a particular thread of narrative where one needs to call attention to a specific set of items while having the larger set of items available for the user to browse or to give the user the larger context. Various visual styles may be supported that are tailored to the authorer's intended style or the content type. Categorized displays and faceted search are also supported in various embodiments.

2.5.2 Zoomable Media ES

A "zoomable media" type ES presents a logically 2D document or image, with an optional $3^{rd}$ dimension of time (i.e., video). This includes arbitrary resolution (including Gigapixel) panoramas, as well as hierarchically stored images (such as supported by the "Deep Zoom" functionality of Silverlight®). This experience allows the user to dive into (pan/zoom into) the media, and (for video) arbitrary slow down or speed up or freeze or even reverse time (while also supporting pan/zoom of video). For all media, the notion of embedded artifacts (bound to the content) as well as highlighted regions (highlighted by various means such as outlines, or a spotlight or a simulated laser pointer. An example of a specific sub-scenario is a document browser, supporting next and previous pages. Another example of a specific sub-scenario is a series of cutaway diagrams that fade into each other as the user dives in. All such scenarios support programmatic (guided) walkthroughs.

2.5.3 Relationship Graph ES

A "relationship graph" type ES represents a set of labeled relationships between entities. The user is allowed to navigate the graph, bringing specific nodes or edges of the graph into focus by selecting or hovering over nodes or edges. Bringing specific nodes or edges into focus serves to present more information to the user, or to trigger events (such as, for example, launching a narrative, viewing an associated web page, purchasing an associated item (such as a poster of an athlete shown in a selected node). As with other experience streams, this can all be scripted as part of a guided tour.

2.5.4 Map ES

A "map" type ES presents a map in one of many styles. In general, these types of ES are used to give spatial context to a RIN by supporting illustration of "routes" (arrows showing perhaps a path of travel), embedded artifacts (additions to the map indicating extra information about various locations and regions). Embedded artifacts can also be used to use the map experience stream as a kind of table of contents into a RIN, a related narrative or related content, much as the "content browser" and "relationship graph" type ESs may be used to navigate content. The map experience stream also supports highlighting regions. In addition, the map experience stream can be bound to various data sets, such as, for example, internet-based map data such as provided by Microsoft® Live Maps or Google® Maps; proprietary map data; localized content not registered on the earth (such as, for example, a fictitious treasure map).

2.5.5 Timeline ES

A "timeline" type ES represents chronologies. The "timeline" type ES is used to give temporal context to a RIN. The "timeline" type ES can be applied at various time scales depending on authoring intent. As with the aforementioned types of ES, the "timeline" type ES can include embedded artifacts that represent clickable content—either for the story or narrative provided by the RIN, or for providing a way to navigate content. Note that the "timeline" type ES is zoomable, and can support multiple timelines layered on each other. In addition, the "timeline" type ES supports various visual styles. Finally, the "timeline" type ES can bind to either static or dynamically obtained data (as can all the various types of ES described herein).

2.5.6 Configurable Toolbar/Player Controls ES

A configurable toolbar or player controls type ES represents a toolbar and/or control panel that (in one manifestation) fades in when the user expresses intent to interact with the underlying media content of an ES (such as, for example, by moving the mouse or touching the display) and fades out when the narrative is in "play" mode. This type of ES provides a control that has display or screen real estate for experience-specific user controls, as well as for "single click/press" access to related views such as a map view, relationship graph view, console view, timeline experience stream, or any other experience streams. In various embodiments, the configurable toolbar also includes screen real estate to host dynamically added controls for the particular ES that has input focus.

2.5.7 RIN In RIN ES

The idea of embedding a RIN within an existing RIN ES (referred to herein as "RIN in RIN ES") encapsulates an existing RIN inside an experience stream. This latter RIN (i.e., the RIN embedded in the ES) plays within the screen and audio real estate assigned to the RIN in RIN ES instance. Data binding information in the RIN in RIN ES can include which portion of the existing RIN should play. By default it can play the entire RIN end to end. The RIN in RIN ES enables a number of scenarios, including:
1. A RIN can serve as an annotated commentary over an existing RIN, referencing individual parts of note of the latter RIN, adding commentary (the latter as additional experience streams).
2. A RIN can serve as a multimedia directory for other RINs, enabling each other RIN to play as a popup to give the user a preview of the latter RINs content. Clicking on the latter RIN can launch a fresh instance of the player with the selected RIN.

Two or more RINs can each be encapsulated in a RIN on RIN, and played side-by-side within an encapsulating RIN. The latter RIN can make comments about the differences and similarities of content between the two former RINs.

2.6 Designing Experience Streams

In order to better understand the design and construction of experience streams, the following discussion of designing experience streams will start with a statement of what experience streams are not. They are not bits and pieces of raw media and graphics, whose positions and locations are choreographed by the player. Therefore, if an ES designer wants to choreograph bits and pieces of media for inclusion in a RIN, then that ES will first have a higher level definition of what the designer is trying to do, along with the details of the media layout and choreographing within the ES provider through the use of the aforementioned data bindings and trajectory.

Broadly speaking, each ES implements an interactive visualization of some higher level construct. A good way to concretely characterize the "essence" of an ES is to examine what constitutes its keyframes—which, as discussed above, represent snapshots of its state. Following are several examples of this concept:
  Map ES: (this is for a world map case, vs. architectural maps)—(Latitude, Longitude), 3D camera parameters (represented in world coordinates), map styles—antique, aerial, road, which Embedded Artifacts are enabled, etc.
  Relationship graph ES: node in focus, zoom level (represented as broadly number of related nodes in focus), and various styles talking about arcs and nodes.
  Wall ES: Which item is selected, zoom level (represented as number of items in view, high level styles of presentation—along a perspective wall/along a flat 2D grid, etc.)
  PhotoSynth® ES: Coordinates and parameters in 3D, which object is selected, certain high-level style modes, such as with/without point clouds.
  Slideshow ES: Which is the current slide. What is the style of the slide show (chiefly, how transitions are represented).
  Enhanced player controls/toolbar: which toolbar items are showing, where is the scrubber bar, which timeline annotation is visible if any.
  Pivot ES: Which item or items are in focus. Values for selected Pivot fields. View settings (bar chart, grid view, details view).

The primary role of the RIN player is to allow somewhat ham-handed composition of ESs, allowing them to dynamically come in and leave on cue (giving them the opportunity to pre-load), and facilitate communication between them. The primarily role of the RIN player is not to make it easier, or an alternative to implementing experience streams. It is, in particular, not the role of the RIN player and orchestrator to implement slide show functionality by bring and out individual images, managing their transition, or to move or resize an image from one position to another.

2.6.1 Scope

Rather than have a plethora of ES with minor variations, it is useful to have fewer ES that can serve multiple roles with one or more style settings (e.g., using some of the predefined ES types discussed above). For example, the zoomable media ES (referred to below as "ZMES") unifies the following kind of data visualizations:
  Zooming into deep zoom images;
  Zooming into regular images;
  Zooming into Video;
  Non-linear Video navigation; and
  Navigating pages in a pre-rendered (XPS or PDF) multi-page document and zooming into contents of a page.

For each of these scenarios, ZMES provides a common set of functionality:
  Highlights with various styles;
  Embedded Artifacts; and
  Consistent controls for panning and zooming.

One rationale for merging exploration of these different types of media (video, image, deep-zoom, documents) into a single ES is that there is a structural commonality between all these media types: they all have a fixed 2D layout. Video added a third dimension of time. Similarly, multi-page documents add a third dimension of page number.

The aforementioned wall ES is another example of an ES that supports multiple scenarios. The Wall ES supports 1D and 2D grid layouts of content items, and search across these items. Clicking on an item precipitates an event that can be bound to various actions, such as jumping to a fresh location in the same or different RIN, or playing a piece of media as an overlay. The Wall ES supports various scenarios, including, for example:

A console view visual "table of contents" into a RIN; and

A content browser, to let the user browse through media such as images, video, text and even other RINs.

Defining the scope of a particular ES is ultimately a judgment call made by the ES authorer. For example, in the example above, the multiple-page document viewer may be calved into a separate ES, if desired. There are several advantages to having fewer experience streams:

Fewer binaries to maintain;

Lesser duplication of code; and

Fewer keyframe formats.

Further, in various embodiments, experience streams can be segregated into one of several "classes" of ES, such as, for example:

Predefined Experience Streams that serve a broad spectrum of Narratives. Examples of these are Zoomable Media, Map and Content Browser types of ES;

"Specialized" Experience Streams that serve niche communities of RIN authors. One simple example is a specialized visualization ES for, say, financial analysis, that is bound to very specialized data sources. Another example is essentially a front end to an interactive program run as a service (such as a program that teaches math); and "Visualization Library" Experience Streams that package various kinds of visualization tools such as charts, graphs, and more sophisticated visualizations such as Treemaps.

2.6.2 Data Binding

As discussed above in Section 2.3, there are several possibilities for locating the data that is needed for rendering an ES. This data is used to define the world or environment being explored, including any embedded artifacts required for the specific RIN. These data could be located in several places such as, for example:

1. Within the Auxiliary Data of the Experience Stream itself;
2. As one or more items in the Resource Table for the containing Segment. The Experience Stream would contain references (called Resource References) to items in the table;
3. As external files referenced by one or more URLs; and
4. Results of a dynamic query to an external service, which may be a front for a database. One example of which is search results returned either directly or as one or more URLs in response to a user query to a search engine such as Bing™.

In designing the data binding mechanism for a new ES, it is good practice to consider supporting each of the aforementioned mechanisms of data binding. In fact, when creating experience streams, binding data can be represented as "collections of items", which may be compatible with conventional "Odata" database service queries, if desired, while also defining an XML format (or other scripted language) for these collections. Further, experience streams may share a common data format, making population of the experience streams a sipler task. Besides the conceptual, design and implementing efficiency of using a shared data model, there are also certain benefits to using shared data references.

2.7 Examples Of Using Various ES In Combination

The following discussion provides various examples of using various combinations of some of the ES described in Section 2.5 and Section 2.6 to construct RINs. In general, these ES may be used in isolation or in groups. Note that in all cases these ES can be composed with other ES such as audio background and audio narration experience streams.

2.7.1 "Dashboard" Or "Console" Example

A dashboard or console can be constructed from various ES to provide an overview and breakdown of a RIN. The user can pan left to right and get a sense of the sections and highlights of a RIN. Clicking on an item launches that portion of the RIN. In a "walkthrough" mode, this can be used to give an overview of the narrative of the RIN, with accompanying vocal narrative and perhaps text subtitles. Search is also supported.

2.7.2 Collection Of Media Example

A collection of media such as, for example, images, including gigapixel and "Deep Zoom" images, videos, etc., can be constructed by combining various ES. The user can browse the media. Selecting an item launches the Zoomable Media browser (i.e., the zoomable media ES or ZMES) which can be used to drill down into a particular media item. In a scripted mode, this can be used to give an overview of a collection of items, and then dive into a selection of images, continuing the narrative of the RIN. Embedded artifacts and highlights can be used to give extra context or annotations to the material. For example, a portion of a Deep Zoom image can be highlighted relevant to the vocal commentary. This covers a very broad category of presenting content as a combination of guided tour and user exploration.

2.7.3 Detailed Annotated Video Example

A sub-case of using the Zoomable Media experience stream or ZMES is annotated video, where under control of the narrator, the video can be panned and/or zoomed, as well as being slowed, reversed, frozen, and/or sped-up in nonlinear ways to illustrate some point, with highlighted regions and embedded artifacts used to augment the raw video. Note that video annotation is a part and parcel of the more general experience streams, so it enables seamless transition from other ES into video annotation. Note that, in contrast, conventional annotated video (such as Microsoft® Tuva video presentations) are one-off purpose built applications.

2.7.4 Cutaway Diagrams Example

This is a scenario where a zoomable media is used to represent a series of "cutaway" diagrams. For example this could be a detailed chart of the human body, and as the user zooms in (or under programmatic walkthroughs), additional levels of detail/cutaways are brought in. This in combination with audio narrative and also being able to transition to other forms of media such as video and other experience streams.

2.7.5 Toolbar Example

Using the toolbar to quickly jump to related views such as a map (synched to the current location), or relationship graph (synched to the node or nodes appropriate to the content being currently viewed), a timeline view (showing historical context), or a console view (showing the current scene in context to other parts of the Narrative, a "related content" view that can be arbitrary content related to the current scene being viewed.

2.7.6 Travelog Example

A travelog RIN can be constructed using the timeline and map type ES to anchor events in time and space. Trajectories are then used on the map to animate paths taken during the travel experience being illustrated by the RIN (or by one or more ES associated with a particular RIN).

2.7.7 Historical Events Example

A historical events RIN can be constructed by using the timeline and map type ES to anchor events in time and space. Animated highlights and embedded artifacts are then used to illustrate geographical events—say the movement of a war frontline or migrations of displaced civilians.

3.0 Exemplary Operating Environments

Figure 4:
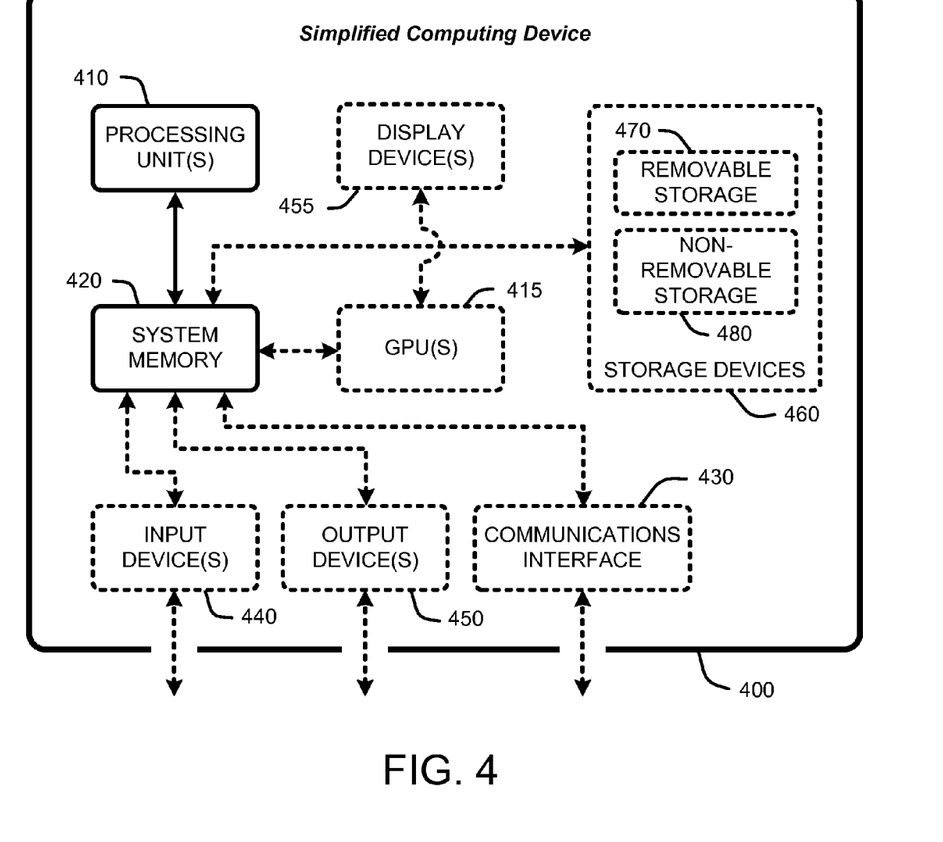
FIG. 4 is a general system diagram depicting a simplified general-purpose computing device having simplified computing and I/O capabilities for use in implementing various embodiments of the ES, as described herein.

The various components of a RIN, such as the various types of ES described herein are operational within numerous types of general purpose or special purpose computing system environments or configurations. FIG. 4 illustrates a simplified example of a general-purpose computer system on which various embodiments and elements of the various ES, as described herein, may be implemented. It should be noted that any boxes that are represented by broken or dashed lines in FIG. 4 represent alternate embodiments of the simplified computing device, and that any or all of these alternate embodiments, as described below, may be used in combination with other alternate embodiments that are described throughout this document.

For example, FIG. 4 shows a general system diagram showing a simplified computing device 400. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the ES, the device should have a sufficient computational capability and system memory to enable basic computational operations. In particular, as illustrated by FIG. 4, the computational capability is generally illustrated by one or more processing unit(s) 410, and may also include one or more GPUs 415, either or both in communication with system memory 420. Note that that the processing unit(s) 410 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 4 may also include other components, such as, for example, a communications interface 430. The simplified computing device of FIG. 4 may also include one or more conventional computer input devices 440 (e.g., pointing devices, keyboards, audio input devices, video input devices, haptic input devices, devices for receiving wired or wireless data transmissions, etc.). The simplified computing device of FIG. 4 may also include other optional components, such as, for example, one or more conventional computer output devices 450 (e.g., display device(s) 455, audio output devices, video output devices, devices for transmitting wired or wireless data transmissions, etc.). Note that typical communications interfaces 430, input devices 440, output devices 450, and storage devices 460 for general-purpose computers are well known to those skilled in the art, and will not be described in detail herein.

The simplified computing device of FIG. 4 may also include a variety of computer readable media. Computer readable media can be any available media that can be accessed by computer 400 via storage devices 460 and includes both volatile and nonvolatile media that is either removable 470 and/or non-removable 480, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the ES described herein, or portions thereof, may be stored, received, transmitted, or read from any desired combination of computer or machine readable media or storage devices and communication media in the form of computer executable instructions or other data structures.

Finally, the ES described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the various types of ES has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the various ES described herein. It is intended that the scope of the invention be limited not by this detailed description, but rather by the claims appended hereto.

What is claimed is:

1. A computer-implemented method for creating one or more "experience streams" for use in enabling interactive narratives, comprising using a computer to perform steps for:
   defining an "experience stream" as including a set of "data binding" elements that define and populate an environment through which the experience stream runs and a set of "trajectory" elements comprising any combination of "keyframes", "transitions", and "markers";
   wherein the set of data binding elements includes "environment data" comprising elements including any combination of images, video, and audio;
   wherein the set of data binding elements further includes zero or more "artifacts" comprising one or more objects logically embedded in an image;
   wherein the set of data binding elements further includes zero or more highlighted regions within an image;
   said keyframes each comprising information states that define states of corresponding elements of the environment data at one or more points in time;
   said keyframes each further comprising a particular environment-to-viewport mapping at a particular point in time;
   wherein each environment-to-viewport mapping is defined by one or more layout constraints that dictate a size and position of each viewport relative to each other viewport in the environment; and
   said "markers" being used to specify a particular point in a logical sequence of an interactive narrative constructed by combining multiple experience streams.

2. The method of claim 1 wherein the set of data binding elements further includes one or more "auxiliary data" items.

3. The method of claim 2 wherein the "auxiliary data" items further include "provider information" that binds each experience stream to resources that understand and are capable of presenting media content specified by the environment data during a presentation of the interactive narrative to a user.

4. The method of claim 1 wherein the set of trajectory elements includes zero or more "transitions" that define a state change from one scene to the next in the interactive narrative.

5. The method of claim 1 wherein each experience stream provides an interactive scripted path through the environment data.

6. The method of claim 5 wherein two or more keyframes are bundled into a keyframe sequence that makes up the interactive scripted path through the environment data.

7. The method of claim 1 wherein each experience stream provides a viewport onto a virtual world represented by the environment data.

8. The method of claim 1 wherein one or more of the experience streams supports user pause-and-explore type operations while the user is viewing the interactive narrative.

9. A system for creating one or more "experience streams" for use in enabling interactive narratives, comprising:
   a computing device configured to define an "experience stream" as including a set of "data binding" elements that define and populate an environment through which the experience stream runs and a set of "trajectory" elements comprising any combination of "keyframes", "transitions", and "markers";
   wherein the set of data binding elements further includes "environment data" comprising elements including any combination of images, video, and audio;
   wherein the set of data binding elements further includes zero or more "artifacts" comprising one or more objects logically embedded in an image;
   wherein the set of data binding elements further includes zero or more highlighted regions within an image;
   said keyframes each comprising information states that define states of corresponding elements of the environment data at one or more points in time;
   wherein the set of trajectory elements are used to structure how the experience stream evolves as a function of narrative time;
   said "markers" being used to specify a particular point in a logical sequence of an interactive narrative constructed by combining multiple experience streams; and
   wherein multiple experience streams are mapped to different viewports in the environment using layout constraints that dictate a size and position of each viewport relative to each other viewport in the environment.

10. The system of claim 9 wherein the set of data binding elements further includes one or more "auxiliary data" items, and wherein the "auxiliary data" items further include "provider information" that binds each experience stream to resources that understand and are capable of presenting media content specified by the environment data during a presentation of the interactive narrative to a user.

11. The system of claim 9 wherein the set of trajectory elements includes zero or more "transitions" that define defines a state change from one scene to the next in the interactive narrative.

12. The system of claim 9 wherein each experience stream provides an interactive scripted path through the environment data.

13. The system of claim 9 wherein each experience stream provides a viewport onto a virtual world represented by the environment data.

14. The system of claim 9 wherein one or more of the experience streams supports user pause-and-explore type operations while the user is viewing the interactive narrative.

15. A computer storage media having computer executable instructions stored therein, that, when executed, cause one or more processors to perform acts for creating one or more "experience streams" for use in enabling interactive narratives, said instructions comprising:
   defining an "experience stream" as including a set of "data binding" elements that define and populate an environment through which the experience stream runs and a set of "trajectory" elements comprising any combination of "keyframes", "transitions", and "markers";
   wherein the set of data binding elements further includes "environment data" comprising elements including any combination of images, video, and audio;
   wherein the set of data binding elements further includes zero or more "artifacts" comprising one or more objects logically embedded in an image;
   wherein the set of data binding elements further includes zero or more highlighted regions within an image;
   said keyframes each comprising information states that define states of corresponding elements of the environment data at one or more points in time;

said keyframes each further comprising a particular environment-to-viewport mapping at a particular point in time;

wherein each environment-to-viewport mapping is defined by one or more layout constraints that dictate a size and position of each viewport relative to each other viewport in the environment; and said "markers" being used to specify a particular point in a logical sequence of an interactive narrative constructed by combining multiple experience streams.

16. The computer storage media of claim 15 wherein the set of data binding elements further includes one or more "auxiliary data" items, and wherein the "auxiliary data" items further include "provider information" that binds each experience stream to resources that understand and are capable of presenting media content specified by the environment data during a presentation of the interactive narrative to a user.

17. The computer storage media of claim 15 wherein the set of trajectory elements includes zero or more "transitions" that define defines a state change from one scene to the next in the interactive narrative.

18. The computer storage media of claim 15 wherein each experience stream provides an interactive scripted path through the environment data, and wherein two or more keyframes are bundled into a keyframe sequence that makes up the interactive scripted path through the environment data.

19. The computer storage media of claim 15 wherein each experience stream provides a viewport onto a virtual world represented by the environment data.

20. The computer storage media of claim 15 wherein one or more of the experience streams supports user pause-and-explore type operations while the user is viewing the interactive narrative.

* * * * *